March 22, 1966    M. GOODMAN    3,241,755
PUNCH TYPE TOKEN ISSUING MECHANISM WITH
PERIODIC PUNCH REORIENTATION
Filed Oct. 8, 1962    3 Sheets-Sheet 1

INVENTOR.
MORRIS GOODMAN
BY
Hood, Gust & Irish
Attorneys

March 22, 1966 M. GOODMAN 3,241,755
PUNCH TYPE TOKEN ISSUING MECHANISM WITH
PERIODIC PUNCH REORIENTATION
Filed Oct. 8, 1962 3 Sheets-Sheet 2
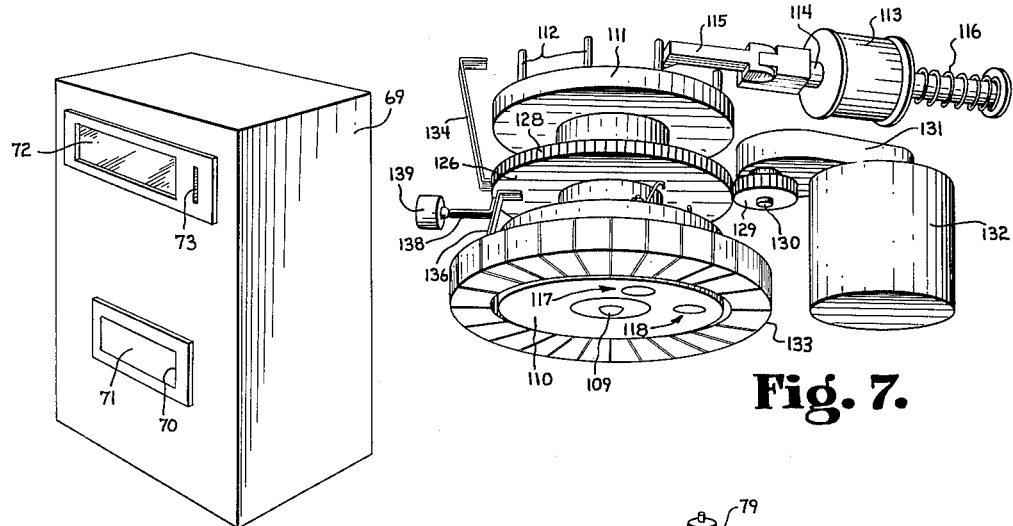
Fig. 7.
Fig. 5.
Fig. 8.
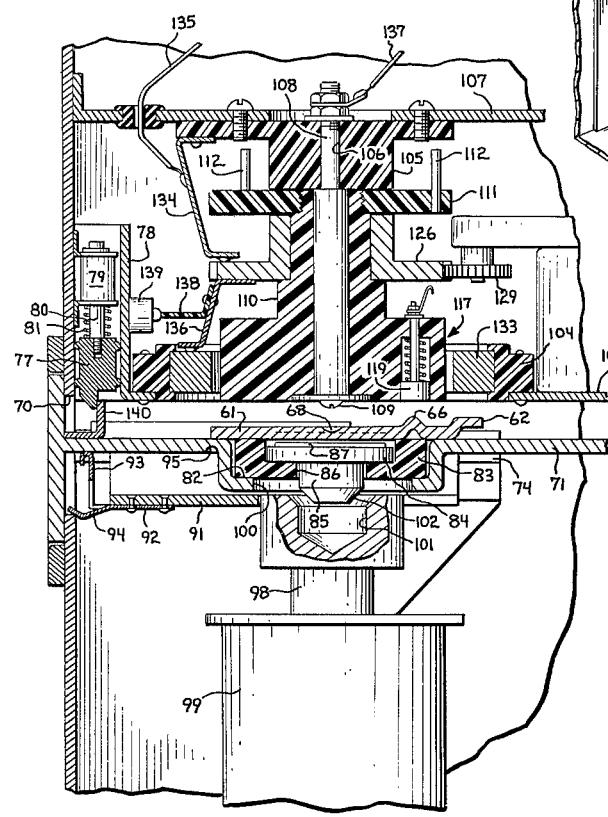
Fig. 6.
INVENTOR.
MORRIS GOODMAN
BY
Hood, Gust & Irish
Attorneys March 22, 1966 M. GOODMAN 3,241,755
PUNCH TYPE TOKEN ISSUING MECHANISM WITH
PERIODIC PUNCH REORIENTATION
Filed Oct. 8, 1962 3 Sheets-Sheet 3

INVENTOR.
MORRIS GOODMAN
BY
Hood, Gust & Irish
Attorneys

United States Patent Office 3,241,755
Patented Mar. 22, 1966

3,241,755
PUNCH TYPE TOKEN ISSUING MECHANISM
WITH PERIODIC PUNCH REORIENTATION
Morris Goodman, 30 W. Court St., Indianapolis, Ind.
Filed Oct. 8, 1962, Ser. No. 229,082
8 Claims. (Cl. 234—131)

The present invention relates to mechanism for use in connection with parking areas such as parking lots, parking garages and the like, and constructed and arranged automatically to issue a distinguishing token when a vehicle is moved into such an area and, upon receipt of that token at a later time when the vehicle operator is ready to remove his vehicle, to calculate the fee to be collected, to receive the money and thereupon to release the vehicle for removal from the area.

The primary object of the invention is to provide mechanism which will almost completely obviate the necessity for attendants at parking areas by automatically issuing a "ticket" or token to a patron before admitting a vehicle to the area, and then utilizing that token automatically to calculate the parking fee to be paid when the patron is ready to remove his vehicle. In such a system, of course some sort of barrier means must be provided for preventing unauthorized entry of vehicles to the area and for preventing removal of a vehicle without payment of the required fee.

A further object of the invention is to provide novel automatic means for issuing a timed token before a vehicle can enter a parking area. A still further object of the invention is to provide automatic means, dominated by such a token, for calculating the elapsed time between issuance of the token and the introduction of that token into the calculating means. Obviously, such a calculating means may be so constructed as to indicate the fee to be collected, based upon any predetermined unit of charge per unit of time.

Another object of the invention is to provide, in association with such calculating means, coin-actuated means for clearing such calculating means for reception of another token and for removing a barrier means to permit a single vehicle to leave the parking area.

Still another object of the invention is to provide, in connection with such token-issuing and fee-calculating and -collecting means, counter mechanism so constructed and arranged as to prevent operation of the token-issuing means except at times when there is unoccupied parking space within the area.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appened claims is not violated.

FIG. 5 is a reduced perspective view of a housing in which the token-actuated fee-calculating mechanism may be enclosed;

FIG. 6 is a broken, vertical section through such mechanism, showing the parts in their positions assumed when a token to be read has been situated on the slide and the slide has just been pressed home to energize the reading mechanism;

FIG. 7 is a prespective view of the token-sensing mechanism and the time-controlled drive means therefor;

FIG. 8 is a top perspective view of the token-receiving slide and the clearing means therefor, looking from the inside of the housing toward the front wall thereof;

Figure 1:
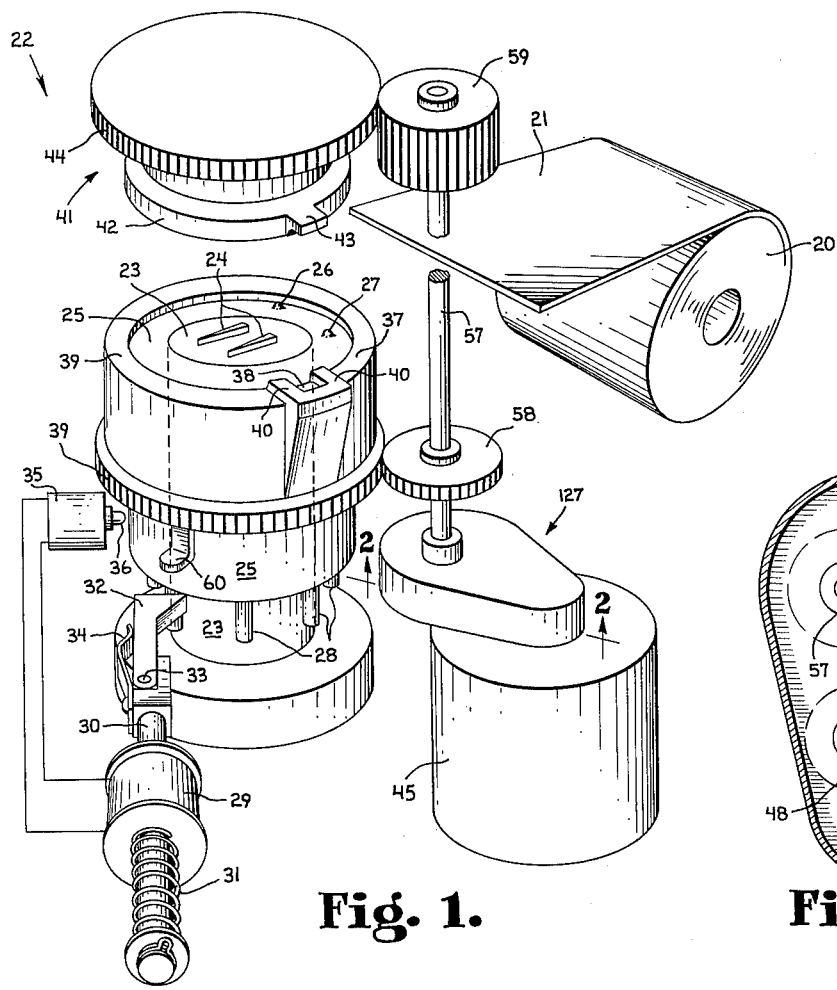
FIG. 1 is a perspective, somewhat diagrammatic, illustration of token-producing and issuing mechanism constructed in accordance with the present invention.

Referring more particularly to FIGS. 1 to 4, it will be seen that I have suggested a coil 20 of flexible, electrically-conductive, sheet or strip material from which a ribbon 21 leads toward token-punching mechanism indicated generally by the reference numberal 22. Feed means (not shown) will be suitable operatively associated with the ribbon 21 and will be constructed and arranged to advance a suitable length of the ribbon 21 into the punching mechanism whenever a vehicle is driven onto a treadle 159 disposed outside but closely adjacent a suitable barrier means 160 normally barring vehicle entrance to a parking area 161. The token-issuing mechanism 22, enclosed, of course, in a suitable housing, will be conveniently arranged adjacent the location of the operator's seat of a vehicle barred by such barrier means. As shown, such mechanism comprises a stationary, cylindrical core 23 the exposed end surface of which is formed with one or more orienting ribs or projections such as those illustrated at 24.

A day dial 25 is journalled for rotation upon the core 23 and its exposed, annular surface, which is flush with the end face of the core 23, is formed with a pair of globular protuberances 26 and 27 which are angularly spaced from each other by $\frac{1}{7}$ of 360°. From the base of the annular day dial there depend seven equiangularly spaced pins or teeth 28.

Suitably stationarily mountted adjacent the assembly just described is a solenoid 29 having a plunger or armature 30 which is resiliently retained, by means of a retracting spring 31, in the illustrated, retracted position. At the forward end of said armature is suitably mounted a pawl 32, said pawl being pivotally connected to the armature at 33 and a leaf spring 34 being provided to retain the pawl yieldably in alignment with the armature 30. As is clearly seen in FIG. 1, the pawl 32 is arranged for cooperative engagement successively with the teeth 28 to drive the dial 25, step-by-step, in a clockwise direction as viewed from above, said pawl being ineffective to drive the dial in a counter-clockwise direction. A switch 35 mounted adjacent the assembly 22 has an actuator 36 which, when depressed, will momentarily energize the solenoid 29 to advance the pawl 32 a distance sufficient to turn the dial 25 through $\frac{1}{7}$ of a revolution, whereafter the spring 31 will return the armature 30 to its illustrated position.

An hour dial 37 is journalled for rotation relative to the dial 25, the exposed, annular face of the dial 37 being elevated somewhat above the plane common to the exposed faces of the core 23 and the day dial 25. At one point in its annular extent, the exposed face of the dial 37 is provided with a radial notch 38 defined between a pair of protuberances 40 and closed at its radially outer end for a purpose which will become apparent. Near its lower end, the dial 37 carries a ring gear 39 for a purpose which will appear.

Suitably supported adjacent the assembly just described is a punch indicated generally by the reference numeral 41 and having a punch head 42 which is proportioned and designed for shearing cooperation with the internal periphery of the dial 37. At a point corresponding to the location of the notch 38, said punch head 42 is formed with a tongue 43. The lowermost face of the punch head 42 is plane, except for the provision therein of an annular groove (not shown) located for registration with the protuberances 26 and 27 of the day dial 25; and except for a central protuberance for a purpose which will appear.

Suitable mechanism (not shown), dominated by the above-mentioned treadle, will move the punch 41, after the ribbon 21 has been advanced as above described, to force the punch head 42 into the upper end of the dial 37, thereby punching a token 61 from the body of the ribbon 21, said token being generally discoid but having a tongue or tab projecting radially from its periphery and offset from the general plane of the token through the cooperation of the tongue 43 with the notch 38. Additionally, the token material will be compressed between the ribs 24 and the plane face of the punch head 42 to define sockets 64 in the bottom surface of the token, and the token material will further be distorted, by the entry of the protuberances 26 and 27 into the above-mentioned groove in the punch head 42, to define bumps 65 and 66 upstanding from the top surface of the token.

After the token has so been formed, the punch 41 will be automatically retracted and the token will be discharged from the assembly 22. Such discharge can be accomplished in any one of several known ways, as, for instance, by means of an ejector pin reciprocable through the core 23, or by mounting the entire assembly 22 upon an axis inclined to the vertical so that the token will drop out of the die upon retraction of the punch. Retraction of the punch may actuate means (not shown) for withdrawing the entrance barrier 160 and may also advance the plus side of counter means 162 for a purpose which will appear.

Figure 2:
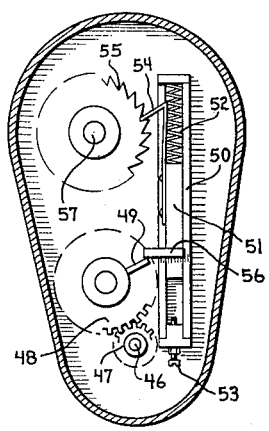
FIG. 2 is a horizontal sectional view, drawn to an enlarged scale, and taken substantially on the line 2—2 of FIG. 1, looking in the direction of the arrows.

In FIG. 2, I have illustrated one suitable form of timer mechanism for advancing the dial 25 and the punch 41. As shown, said punch carries a gear 44. Mounted adjacent the assembly 22 is a clock-type electric motor 45 whose spindle 46 is connected to drive transducer mechanism indicated generally by the reference numeral 127. Said spindle 46 carries a pinion 47 meshing with a gear 48 suitably mounted on a stub shaft which carries a radial pin 49. A guide 50 is mounted adjacent the path of the pin 49 and reciprocably receives a slide 51. A spring 52 confined in the guide 50 bears upon the slide 51 to urge it resiliently toward and adjustable stop screw 53. The slide 51 carries a spring finger 54 which is arranged for cooperation as a pawl with a ratchet wheel 55 fixed to a shaft 57. The slide 51 further carries a pin 56 which projects into the path of the pin 49.

As the spindle 46 rotates continuously in a clockwise direction as viewed in FIG. 2, it will drive the gear 48 and pin 49 slowly in a counter-clockwise direction. Each time the pin 49 encounters the pin 56, the slide 51 will be raised, against the tendency of the spring 52, to move the pawl 54 upwardly as viewed in FIG. 2, said pawl ratcheting past the teeth of the wheel 55 due to the inherent resiliency of the spring pawl finger, without turning said wheel. In FIG. 2, the parts are shown with the slide 51 in partially elevated position and with the finger 49 almost ready to move out of engagement with the pin 56. When said pin 49 does leave the pin 56, the spring 52 will quickly return the slide 51 to engagement with the stop screw 53, whereby the pawl 54, engaging the teeth of the ratchet 55, will turn the shaft 57 through a predetermined arc of rotation. The current position of adjustment of the screw 53 will, of course, accurately determine the extent of that arc. The shaft 57 carries a pinion 58 meshing with the ring gear 39 and a second pinion 59 meshing with the gear 44 on the punch 41. Thus, the dial 37 and the punch 41 will be turned synchronously whereby the tongue 43 will always register with the notch 38. The gear 59 is, as shown, of significant axial length so that the punch 41 may reciprocate without loss of meshing engagement between the pinion 59 and the gear 44.

It will be obvious that the mechanism illustrated in FIG. 2 may be designed to advance the dial 37 and the punch 41 once in any predetermined time period which may be an hour or any portion of an hour, depending upon the predetermined rates to be charged for parking. At any rate, the design will be such that the dial 37 and the punch 41 will be turned through one complete revolution in each twenty-four hours.

A cam finger 60 is carried by the dial 37 at the level of the actuator 36 for the switch 35 so that once in every twenty-four hours (for instance, at twelve o'clock, midnight), the finger 60 will engage and shift the actuator 36 to energize the solenoid 29, whereby the dial 25 will be shifted through 1/7 of a resolution.

Figure 3:
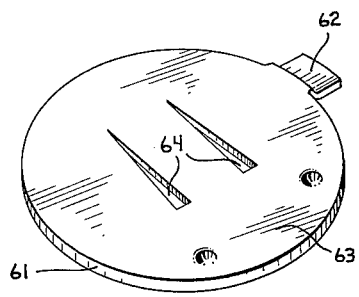
FIG. 3 is an enlarged, bottom perspective of a token of the character which will be issued by the mechanism of FIG. 1.
Figure 4:
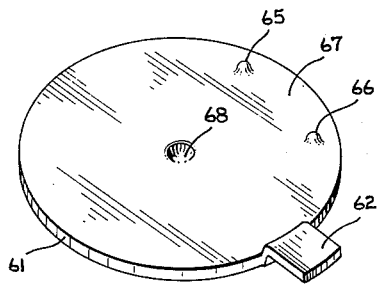
FIG. 4 is a similar, top perspective of such a token.
Figure 9:
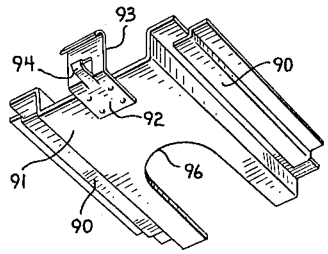
FIG. 9 is a bottom perspective view of an auxiliary slide which is associated with the token-receiving slide, looking rearwardly from the front end thereof.

A typical form of token which will be produced by the mechanism above described is illustrated in FIGS. 3 and 4. As shown, the token 61 will be generally discoid, and its bottom face 63 will be formed with orienting indentations 64 corresponding to the shape and arrangement of the ribs 24 on the exposed face of the stationary core 23. A tongue or tab 62 will extend substantially radially from the periphery of the token 61 and will be somewhat offset from the plane of the top face 67 of the token, the location of said tongue relative to the indentations 64 being dependent upon the current position of the dial 37 at the time when the token is produced. The top face 67 of the token will be formed with two bumps 65 and 66, spaced apart by 1/7 of 360° and positioned, relative to the indentations 64, in a relationship determined by the current location of the dial 25 at the time when the token is produced.

Preferably, the punch head 42 is formed with a central protuberance, as above mentioned, to define a dimple 68 at the center of the top face 67 of the token 61.

Referring now particularly to FIGS. 5 to 9, it will be seen that I have illustrated a case or housing 69 formed to provide a port 70 through which protrudes a slide 71. The case is formed to provide, as well, a window 72 for a purpose later to be described, and a coin slot 73. The slide is mounted for reciprocation in guideways 74 and, as is most clearly shown in FIG. 8, is provided near its rear end with laterally projecting ears 75 to which are connected coiled springs 76, anchored on the housing wall, continually urging the slide 71 forwardly or outwardly. A latch bolt 77 is reciprocably mounted in a guide 78 and normally is engaged behind a suitable tongue 140 carried by the slide 71 to retain said slide in the position illustrated in FIGS. 6 and 8. The latch bolt 77 is carried by the armature 80 of a solenoid 79 in such fashion that, when the solenoid 79 is energized, the latch bolt will be withdrawn to permit the springs 76 to project the slide forwardly to expose a significant portion of its length outside the case 69. Spring means 81 will return the armature 80 upon deenergization of the solenoid 79; the switch means (not shown) dominated by a treadle 163 or other device sensitive to the presence of a vehicle approaching the exit from the parking area, will momentarily energize the solenoid 79 when a vehicle is driven into predetermined proximity to such exit.

The slide 71 is formed to provide a well 82 opening through its upper surface; and loosely seated in said well is a dielectric socketed member 83 whose vertical height is equal to the depth of the well 82. A reciprocable platform element 84 is loosely seated in the socket of the member 83 and includes a depending shank 85 penetrating a perforation 86 in the floor of the member 83. The uppermost face of the element 84 is formed with a pair of ribs 87 identical with the ribs 24, and means, such as the feathered connections 88 and 89 are provided to maintain proper orientation between the member 83 and the slide 71 and between the element 84 and the member 83.

Rails 90 are secured to the bottom surface of the slide 71, and an auxiliary slide 91 is supported therefrom for longitudinal movement relative to said slide 71. A leaf 92 of resilient material is suitably secured to the auxiliary slide near the forward end thereof and includes an upwardly-extending portion 93 disposed ahead of the forward end of the auxiliary slide and smoothly rebent at its upper end, as is most clearly shown in FIG. 6, and a forwarly-extending portion 94 which is cammed at its distal end. The lower surface of the slide 71 is formed with a notch or depression 95, as shown, for a purpose which will appear.

At its rear end, the auxiliary slide 91 is cut away as at 96 to straddle, at times, the head 97 of the armature 98 of a solenoid 99. Said head 97 is aligned with a port 100 in the floor of the well 82 when the slide 71 is in the position of FIG. 6, and so is in cooperative registry with the member 83; and said head is formed with an axial socket 101 which, at such times, registers with the shank 85.

When the solenoid 79 is momentarily energized to retract the latch bolt 77 from engagement with the tongue 140, the springs 76 will, as described above, project the slide 71 to a position in which the well 82 is wholly disposed forwardly beyond the front wall of the housing 69. Engagement of the leaf portion 94 with the housing wall will restrain the auxiliary slide 91 against entrainment with that forward movement until the forward wall of the well 82 comes into engagement with the leaf portion 93 and the distal end of that portion drops into the depression 95. As the slide 71 starts its forward movement, the bevelled surface 102 of the shank 85 coacts with the correspondingly bevelled mouth of the socket 101 to lift the element 84 to a level at which the ribs 87 project above the plane of the top surface of the slide 71. As the shank 85 moves out of engagement with the upper end of the head 97, it will be supported in such elevated position by the auxiliary slide 91; and it is only after the shank has been moved onto said auxiliary slide that said auxiliary slide will be entrained with the further forward movement of the slide 71.

Now, a token 61 may be placed on the slide 71, with the ribs 87 received in the sockets 64, whereby the token is properly oriented on the slide. The customer will then press the slide 71 home, against the tendency of the springs 76, until the tongue 140 cams its way past the latch bolt 77 to the position of FIG. 6. As the shank 85 approaches registry with the head 97, the base of the cut-out 96 in the auxiliary slide 91 comes into engagement with said head, just as the leaf portion 94 attains its position illustrated in FIG. 6, and movement of the auxiliary slide 91 is arrested while rearward movement of the slide 71 continues until the shank 85 registers with the socket 101 and the platform 84 drops to leave the token supported solely on the slide 71 and the member 83.

Upon a perforated plate 103, spaced slightly above the slide 71 and which may be integral with the guide 78, is stationarily mounted, concentrically with respect to the armature head 97, a retainer 104 for a contactor ring 133 which will hereinafter be described in detail. A block 105 of dielectric material, formed with a bore 106 therethrough, is suitably supported from a shelf 107 and provides support for a stationary metal post 108, the lower end of which extends to a level slightly below the level of the bottom surface of the contactor ring 133, is concentric with the shank 85, and may preferably be provided with a knob 109 adapted to seat in the depression 68 of a token.

Journalled on the post 108 for rotation with respect thereto is a rotor 110 of dielectric material, the lowermost face of said rotor being disposed in a plane just below that of the ring 133. A wheel 111 of dielectric material is fixedly secured to said rotor 110 near the upper end thereof and carries a series of seven equiangularly-spaced pins 112.

Suitably mounted near the wheel 111 is a solenoid 113 whose armature 114 carries a pawl 115 cooperable with the pins 112. Each energization of the solenoid 113 will advance the armature 114, whereby the pawl 115, acting upon one of the pins 112, will turn the wheel 111 and rotor 110 through $\frac{1}{7}$ of a revolution. Spring means 116 is provided for returning the armature 114 to retracted position, the pawl 115 camming past the next pin 112 to engage therewith for rotor actuation upon the next energization of the solenoid 113.

Figure 10:
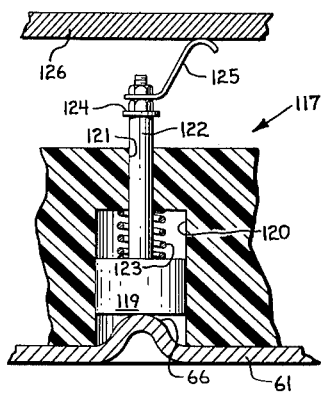
FIG. 10 is an enlarged, vertical section showing the construction of one of a plurality of day-reading switches or feeler assemblies which are incorporated in the calculating mechanism.
Figure 12:
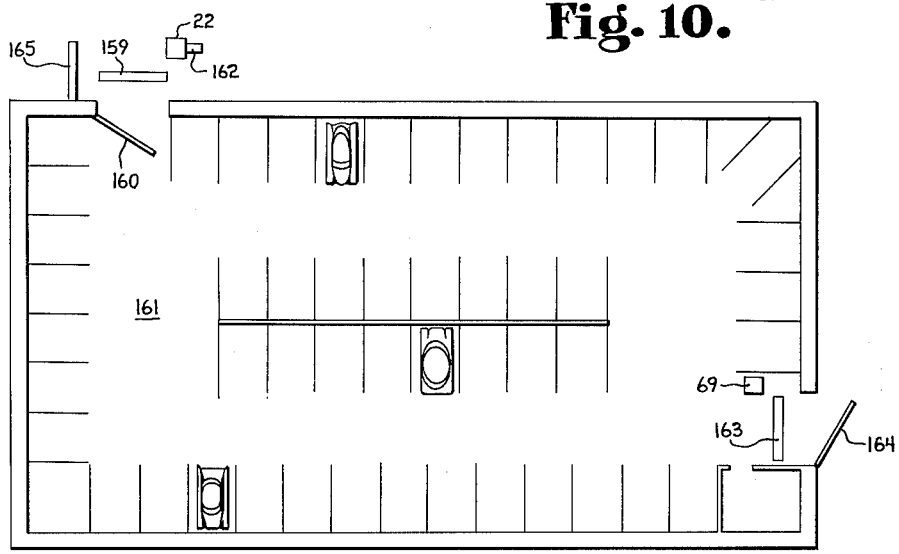
FIG. 12 is a diagrammatic plan of a parking area controlled by the mechanisms contemplated in the present disclosure.

Two feeler assemblies 117 and 118 are carried by the rotor 110. These assemblies are identical and are identically supported; and therefore only one has been illustrated in detail in FIG. 10 and will be described. The assembly 117 comprises a plunger head 119 reciprocably supported in a socket 120 opening through the bottom face of the rotor 110 and having a reduced extension 121 accommodating a stem 122. A spring 123 is sleeved on said stem and is confined between said plunger head and the roof of the socket 120, stop means 124 being carried on said stem whereby the assembly 117 is resiliently held with the bottom face of said plunger head flush with the bottom face of the rotor 110. At its upper end, the assembly 117 carries a spring contact finger 125 which, when the plunger is raised as shown in FIG. 10, makes electrical contact with a conductive collar 126 which is journalled on the rotor 110 near its upper end.

The socket 120 and its analog are radially spaced from the axis of the post 108 a distance equal to the distance equal to the distance between the depression 68 of a token and each of the protuberances 65 and 66.

The collar 126 carries a peripheral series of teeth 128 with which meshes a pinion 129 on the output shaft 130 of transducer mechanism 131 in all respects equivalent to the mechanism 127 (FIGS. 1 and 2), driven by a clock type motor 132 so that the operation of the collar 126 is absolutely synchronized with the dial 37 and punch 41. A brush 134 connected to a lead 135 bears continuously on the collar 126, and said collar further carries a brush 136 which moves with the collar 126 in continuous electrical contact with the ring 133. A lead 137 is connected to post 108.

A dielectric finger 138 is carried by the collar 126 at a level such as operatively to engage the actuator of a switch 139 once upon each revolution of said collar; and movement of said actuator by said finger momentarily energizes solenoid 113 to advance rotor 110 by $\frac{1}{7}$ of a revolution.

Figure 11:
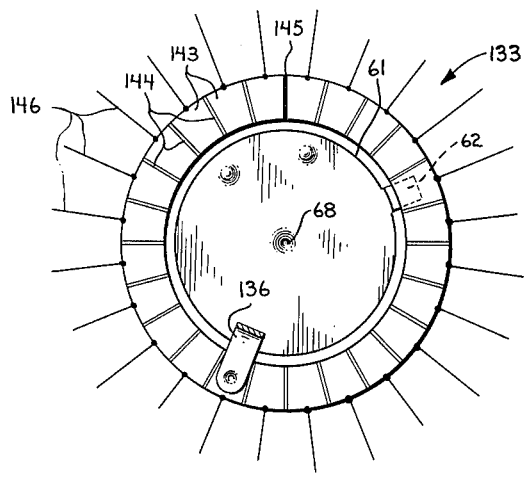
FIG. 11 is an enlarged, somewhat diagrammatic view of a time reading device, showing a token in cooperative association therewith.

As is most clearly illustrated in FIG. 11, the contactor ring 133 is made up of a series of conductor pads 143. In the illustrated embodiment of the invention, there are twenty-four such pads separated by rectifier wafers 144 which are characterized by the fact that they permit current flow therethrough in one direction only. An insulator 145 is inserted between the first conductor pad and the twenty-fourth conductor pad. A lead 146 extends from each conductor pad.

*Operation*

As has been explained, barrier means 160 will guard the entrance to a parking area 161 and a token-issuing assembly 22 enclosed in a suitable housing will be conveniently mounted adjacent such barrier means. When a vehicle is driven into a predetermined relation to such barrier means, it will actuate a treadle 159 or other device sensitive to the presence of a vehicle, whereby the barrier means 160 will be retracted and the mechanism 22 will be actuated to produce a token 61. The relationship of the bumps 65 and 66 to the orienting indentations 64 on that token will depend upon the current position of the dial 25; and, as has been explained above, that "current position" will change at midnight every night, so that the relationship between the bumps and the indentations will show the day of the week on which the token was issued.

The relationship of the tab 62 to the orienting indentations 64 will depend upon the current position of the dial 37 at the time of token issuance; and, as has been explained above, the "current position" of the dial 37 will change periodically, for instance once each hour, under the influence of the motor 45 and the driving mechanism 127. Thus, the position of the tab 62 relative to the orienting ribs 64 will show the hour of the day upon which the token was issued.

Now, taking his token, the patron drives his automobile into an available space in the area and goes about his business. Meantime, the barrier means 160 will be automatically returned to entrance-blocking position. While he is gone, of course, the collar 126 will advance, step-by-step, as described above, thus moving the brush 135 from pad to pad on the ring 133. If the driver returns on the same day, the rotor 110 will not have moved.

Other barrier means 164 guards the exit from the parking area and a unit 69 is conveniently mounted adjacent thereto. As explained above, when a customer, ready to withdraw his vehicle from the parking area, drives into predetermined proximity to the exit barrier, vehicle-sensitive means will energize the solenoid 79 to retract the latch 77 and the springs 76 will project the slide 71 and the driver will place his token on the slide. In order to permit the token to be carried into the case 69 by the slide, the token must be so arranged that the ribs 87 are received in the orienting indentations 64; and thereby the bumps 65 and 66 will be properly oriented relative to the feelers 117 and 118 and the tab 62 will be properly oriented relative to the ring 133 to correspond with the day and hour when the token was issued. The patron now pushes the slide 71 as far as possible to the rear in the housing 69, and the rear end of the slide engages and moves the actuator of a switch 158. As explained above, such movement of the slide 71 will bring the parts into the relationship illustrated in FIG. 6 in which platform element 84 has dropped away from the token 61. Actuation of switch 158 closes an energizing circuit for solenoid 99 whereby its armature 98 is lifted. Head 97 thus engages and lifts member 83 to press the top face 63 of the token 61 against the bottom face of the rotor 110, the protuberance 109 at the bottom of the post 108 entering the indentation 68 to make electrical contact with the token.

If the token is one which has ben issued on the same day, the feeler assembly 117 will be in registry with the bump 66 on the token and the feeler assembly 118 will be in registry with the bump 65, and the bumps will engage the heads 119 of both assemblies to lift their contact fingers 125 into electrical contact with the collar 126. One type of circuit to a suitable computer mechanism (not shown) is thus closed through the lead 137, post 108, the token, the two contact fingers 125, the collar 126, the brush 134 and the lead 135; and the computer will thus sense the fact that the parking fee to be collected will be for less than one full day. If, however, the solenoid 113 has been energized since issuance of the token, the rotor 110 will have been moved through one step so that the feeler 118 will register with the bump 66 and the feeler 117 will not register with a bump. Thus, a different kind of circuit to the computer will be closed and the computer will sense the fact that a charge for one full day's parking must be added to the hourly charge. If, however, the solenoid 113 has been energized twice since issuance of the token, neither feeler 117 or 118 will register with a bump and no circuit will be closed through either feeler assembly, whereby the computer will sense the fact that the charge must be for more than two full days of parking. The computer will be so constructed that, under such circumstances, it will cause a legend to appear in the window 72 requiring the patron to refer his token to an attendant, and the mechanism will be so affected that the barrier 164 against removal of the vehicle from the parking area will not be withdrawn except by manual control under the supervision of an attendant.

When the token 61 is pressed into contact with the rotor 110, the offset tab 62 makes electrical contact with one of the pads 143. At the same time, the brush 136 will be in electrical contact with another of the pads 143, depending upon the time which has elapsed since the issuance of the token. The condition illustrated in FIG. 11 indicates that the token was issued between four and five o'clock a.m. and that it has been introduced into the calculating mechanism between one and two o'clock p.m. Thus, when the token is lifted as above described, a circuit will be closed from the lead 135 through the brush 134, the sleeve 126, the brush 136 and in a counter-clockwise direction through the contactor pads 143 and the rectifier wafers 144 to the tab 62, thereby affecting the computer, through the leads connected to the pads respectively contacted by the brush 136 and the tab 62, to calculate the parking fee for nine hours and display a legend, indicating that fee, through the window 72.

Now, when the proper amount of the fee is deposited in the coin slot 73, suitable mechanism will cause the exit barrier 164 to be withdrawn, whereby the vehicle may be driven away.

At the same time, the solenoid 99 will be deenergized and the head 97 will return to the retracted position of FIG. 6, wherein the token 61 rests solely on the slide 71 and the plane upper surface of the member 83, the platform element 84 being in its lowermost position, as shown. As is illustrated in FIG. 8, a lever 147 is pivoted at 148 on one of the guideways 74, and a solenoid 149 has its armature 150 operatively connected to one arm of said lever. When the plunger head 97 reaches its illustrated position, it actuates a switch (not shown) which momentarily energizes solenoid 149 to swing the lever 147 in a counter-clockwise direction. Said lever is so proportioned and arranged that, as it so swings, it sweeps across the well 82, striking the token 61 and driving it past the rear end of the other guideway 74 and so off the slide 71 into a waste receptacle (not shown), thus clearing the slide for the reception of a token from the next patron who desires to remove his vehicle from the area.

As suggested above, retraction of the punch 41 after issuance of a token may preferably actuate the plus side of a counter device 162. In a similar manner, retraction of the plunger head 97 may actuate the minus side of such a counter. Thus, as vehicles enter the parking area, the token issuing mechanism 22 counts them, while the token-reading mechanism 69 at the exit from the area counts departing vehicles, so that such counter mechanism 162 will at all times maintain a "memory" of the number of vehicles currently within the area. When the conjoint action of the token-issuing and token-reading mechanisms has told the counter device that the number of vehicles currently in the area equals the capacity of the area, suitable means (not shown) may be actuated by such device to render the token-issuing mechanism 22 temporarily inoperative and to display a notice or "Lot Full" sign 165, adjacent the area entrance, that the parking area is full. Upon the subsequent actuation of the exit barrier retraction mechanism, the counter device will actuate said means to obscure such notice and to render the token-issuing mechanism again operative.

The several devices which are indicated diagrammatically or mentioned hereinabove as cooperable with, or actuated by, the mechanism illustrated in the drawings forming a part of this disclosure, but which devices are not representationally illustrated in those drawings, are all available on the commercial market and are known to, and understood by, persons ordinarily skilled in the art to which the present invention pertains.

I claim as my invention:

1. A token-issuing mechanism comprising a cylindrical core, a first annular dial mounted for rotation about the axis of said core, a second annular dial mounted for rotation, independently of said first dial, about the axis of said core, means for turning said first dial at a predetermined rate, means for turning said second dial at a different predetermined rate, a punch cooperable with said core and said dials to stamp out a token from material introduced between said punch and said core and dials, and means for turning said punch about the axis of said core in synchronism with one of said dials, said core and each of said dials being formed to produce indicative variations in the shape of a token formed by cooperation of said punch therewith.

2. A token-issuing mechanism comprising a cylindrical core having an end surface provided with an orienting projection upstanding therefrom, a first annular dial mounted for rotation about the axis of said core and having an end surface substantially flush with said core end surface and provided with a region offset from such flush relation, a second annular dial mounted for rotation, independently of said first dial, about the axis of said core and having an end surface offset from flush relation with said end surface of said first dial in the direction of extension of said orienting projection, a punch arranged coaxially with respect to said core and movable axially into and out of cooperative engagement with said end surfaces of said core and of said first dial, said second dial being formed with a substantially radially-extending notch opening radially inwardly and opennig toward said punch, said punch having a discoid head proportioned and designed for mating reception within the inner diameter of said second dial and being provided with a substantially radial tongue proportioned and designed for mating reception within said notch, means for turning said first dial at a predetermined rate, means for turning said second dial at a different predetermined rate, and means for turning said punch head in synchronism with said second dial, said punch head being movable into and out of cooperative engagement with said core and said dials to stamp out of material introduced therebetween a token formed with an orienting indentation in one face corresponding to said projection, with an indicative offset corresponding to said offset region of said first dial, and with a substantially radially-projecting tab corresponding to said notch and tongue.

3. A token-issuing mechanism comprising a cylindrical core, a first annular dial mounted for rotation about the axis of said core, a second annular dial mounted for rotation, independently of said first dial, about the axis of said core, means for turning one of said dials through one complete revolution in twenty-four hours, means actuated by said one dial, once in each revolution, for advancing the other of said dials through one-seventh of a revolution, a punch cooperable with said core and said dials to stamp out a token from material introduced between said punch and said core and dials, and means for turning said punch about the axis of said core in synchronism with said one dial, said core and each of said dials being formed to produce indicative variations in the shape of a token formed by cooperation of said punch therewith.

4. A token-issuing mechanism comprising a cylindrical core, a first annular dial mounted for rotation about the axis of said core, a second annular dial mounted for rotation, independently of said first dial, about the axis of said core, means for turning one of said dials, step-by-step at predetermined, uniform time intervals, through one complete revolution in twenty-four hours, means actuated by said one dial, once in each revolution, for advancing the other of said dials through one-seventh of a revolution, a punch cooperable with said core and said dials to stamp out a token from material introduced between said punch and said core and dials, and means for turning said punch about the axis of said core in synchronism with said one dial, said core and each of said dials being formed to produce indicative variations in the shape of a token formed by cooperation of said punch therewith.

5. A token-issuing mechanism comprising a cylindrical core, a first annular dial sleeved on said core for rotation about the axis thereof, a second annular dial sleeved on said first dial for independent rotation about said axis, gear means fixed relative to said second dial, a punch coaxial with said core and mounted for axial movement into and out of cooperative engagement with corresponding end surfaces of said core and said dials to stamp out a token from material introduced between said punch and said core and dials, gear means fixed relative to said punch, a shaft mounted for rotation on an axis parallel with the axis of said core, gear means fixed relative to said shaft and meshing with the gear means of said second dial and with the gear means of said punch to drive said second dial and said punch in synchronism, timer means connected to drive said shaft intermittently to advance said second dial and said punch step-by-step at predetermined, uniform time intervals through uniform angular steps, one complete revolution in twenty-four hours, and means actuated by said second dial once in each revolution to advance said first dial through one-seventh of a revolution, said core and each of said dials being formed to produce indicative variations in the shape of a token formed by cooperation of said punch therewith.

6. A token-issuing mechanism comprising a cylindrical core, a first annular dial sleeved on said core for rotation about the axis thereof, a second annular dial sleeved on said first dial for independent rotation about said axis, gear means fixed relative to said second dial, a punch coaxial with said core and mounted for axial movement into and out of cooperative engagement with corresponding end surfaces of said core and said dials to stamp out a token from material introduced between said punch and said core and dials, gear means fixed relative to said punch, a shaft mounted for rotation on an axis parallel with the axis of said core, gear means fixed relative to said shaft and meshing with the gear means of said second dial and with the gear means of said punch to drive said second dial and said punch in synchronism, a clock motor having an output spindle arranged to drive a radial projection in a rotary path, a guide mounted adjacent said spindle, a slide mounted for reciprocation in said guide, a finger carried by said slide and disposed, at times, in the rotary path of said radial projection for operative engagement thereby, spring means yieldably resisting movement of said slide by such engagement, a ratchet wheel carried by said shaft, pawl means moving with said slide and having a one-way operative connection with said ratchet wheel to drive said shaft to advance said second dial and said punch through one complete revolution in twenty-four hours, and means actuated by said second dial once in each revolution to advance said first dial through one-seventh of a revolution, said core and each of said dials being formed to produce indicative variations in the shape of a token formed by cooperation of said punch therewith.

7. A token-issuing mechanism comprising a cylindrical core, a first annular dial sleeved on said core for rotation about the axis thereof, a second annular dial sleeved on said first dial for independent rotation about said axis, gear means fixed relative to said second dial, a punch coaxial with said core and mounted for axial movement into and out of cooperative engagement with corresponding end surfaces of said core and said dials to stamp out a token from material introduced between said punch and said core and dials, gear means fixed relative to said punch, a shaft mounted for rotation on an axis parallel with the axis of said core, gear means fixed relative to said shaft and meshing with the gear means of said second dial and with the gear means of said punch to drive said second dial and said punch in synchronism, a clock motor having an output spindle arranged to drive a radial projection in a rotary path, a guide mounted adjacent said spindle, a slide mounted for reciprocation in said guide, a finger carried by said slide and disposed, at times, in the rotary path of said radial projection for operative engagement thereby, spring means yieldably resisting movement of said slide by such engagement, a ratchet wheel carried by said shaft, pawl means moving with said slide and having a one-way operative connection with said ratchet wheel to drive said shaft only when said slide is driven by said spring means to advance said second dial and said punch through one complete revolution in twenty-four hours, means actuated by said second dial once in each revolution to advance said first dial through one-seventh of a revolution, said core and each of said dials being formed to produce indicative variations in the shape of a token formed by cooperation of said punch therewith.

8. A token-issuing mechanism comprising a cylindrical core, a first annular dial sleeved on said core for rotation about the axis thereof, a second annular dial sleeved on said first dial for independent rotation about said axis, gear means fixed relative to said second dial, a punch coaxial with said core and mounted for axial movement into and out of cooperative engagement with corresponding end surfaces of said core and said dials to stamp out a token from material introduced between said punch and said core and dials, gear means fixed relative to said punch, a shaft mounted for rotation on an axis parallel with the axis of said core, gear means fixed relative to said shaft and meshing with the gear means of said second dial and with the gear means of said punch to drive said second dial and said punch in synchronism, a clock motor having an output spindle arranged to drive a radial projection in a rotary path, a guide mounted adjacent said spindle, a slide mounted for reciprocation in said guide, a finger carried by said slide and disposed, at times, in the rotary path of said radial projection for operative engagement thereby, spring means yieldably resisting movement of said slide by such engagement, stop means adjustably carried by said guide and engageable with said slide to limit movement of said slide in one direction, a ratchet wheel carried by said shaft, pawl means moving with said slide and having a one-way operative connection with said ratchet wheel to drive said shaft to advance said second dial and said punch through one complete revolution in twenty-four hours, means actuated by said second dial once in each revolution to advance said first dial through one-seventh of a revolution, said core and each of said dials being formed to produce indicative variations in the shape of a token formed by cooperation of said punch therewith.

References Cited by the Examiner
UNITED STATES PATENTS

| | | | |
|---|---|---|---|
| 1,883,984 | 10/1932 | Lasker | 234—131 |
| 2,906,505 | 9/1959 | Orr et al. | 256—1 |
| 3,034,711 | 5/1962 | Cohen | 235—61.11 |
| 3,043,504 | 7/1962 | Rabenda | 235—61.11 |
| 3,104,804 | 9/1963 | Kirkowski | 234—131 |

WILLIAM W. DYER, JR., *Primary Examiner.*

HARRISON R. MOSELEY, WILLIAM S. LAWSON,
*Examiners.*